US008890467B2

(12) United States Patent
Almquist et al.

(10) Patent No.: US 8,890,467 B2
(45) Date of Patent: Nov. 18, 2014

(54) SYSTEM FOR CONTROLLING BATTERY CONDITIONS

(75) Inventors: Edward Almquist, Bartlett, IL (US); Martin Krajci, Palatine, IL (US); James Blasko, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 759 days.

(21) Appl. No.: 13/073,039

(22) Filed: Mar. 28, 2011

(65) Prior Publication Data
US 2012/0249284 A1 Oct. 4, 2012

(51) Int. Cl.
| H02J 7/00 | (2006.01) |
| H02J 7/14 | (2006.01) |
| H01M 10/615 | (2014.01) |
| H01M 10/44 | (2006.01) |
| H01M 10/46 | (2006.01) |
| H01M 10/48 | (2006.01) |
| H01M 10/6571 | (2014.01) |
| H01M 10/625 | (2014.01) |
| H01M 10/667 | (2014.01) |
| H01M 10/63 | (2014.01) |
| B60L 11/18 | (2006.01) |

(52) U.S. Cl.
CPC .......... *H01M 10/44* (2013.01); *H01M 10/5006* (2013.01); *H02J 7/1438* (2013.01); *B60L 11/1844* (2013.01); *H01M 10/443* (2013.01); *H02J 7/1423* (2013.01); *H01M 10/46* (2013.01); *H01M 10/48* (2013.01); *H01M 10/486* (2013.01); *B60L 11/1842* (2013.01); *H01M 10/5083* (2013.01); *B60L 11/1824* (2013.01); *H01M 10/5016* (2013.01); *H01M 10/5097* (2013.01); *H02J 7/14* (2013.01); *H01M 10/502* (2013.01)

USPC ........... 320/104; 320/109; 320/134; 320/135; 320/137; 307/10.6; 307/10.7

(58) Field of Classification Search
CPC ............... H02P 1/00; B60L 1/00; B60L 1/02; B60L 1/04
USPC ......... 320/128, 104, 101, 109, 134, 135, 108; 307/10.6, 10.7
See application file for complete search history.

(56) References Cited

U.S. PATENT DOCUMENTS

| 3,440,109 A | 4/1969 | Plattner |
| 3,623,916 A | 11/1971 | Toyooka et al. |
| 5,508,126 A | 4/1996 | Braun |
| 5,599,636 A | 2/1997 | Braun |

(Continued)

FOREIGN PATENT DOCUMENTS

WO 96/17397 A1 6/1996

OTHER PUBLICATIONS

International Search Report and Written Opinion dated Apr. 25, 2012, from corresponding International Patent Application No. PCT/US2012/023154.

*Primary Examiner* — Edward Tso
*Assistant Examiner* — Alexis A Boateng

(57) ABSTRACT

A system and method for controlling battery conditions. The system includes a network access device battery. The network access device battery powers a network access device. A heating element may be connected to the network access device battery. The heating element may be a resistive load for determining a status of the network access device battery or the heating element may be activated based on a heating schedule.

7 Claims, 3 Drawing Sheets

(56) References Cited

U.S. PATENT DOCUMENTS

| | | |
|---|---|---|
| 5,795,664 A | 8/1998 | Kelly |
| 5,834,131 A | 11/1998 | Lutz et al. |
| 5,990,661 A | 11/1999 | Ashtiani et al. |
| 6,002,240 A | 12/1999 | McMahan et al. |
| 6,072,301 A | 6/2000 | Ashtiani et al. |
| 6,078,163 A | 6/2000 | Horie et al. |
| 6,259,229 B1 * | 7/2001 | Ashtiani et al. ............... 320/128 |
| 6,392,388 B1 | 5/2002 | Young |
| 6,441,588 B1 | 8/2002 | Yagi et al. |
| 6,838,858 B2 * | 1/2005 | Berneis et al. ............... 320/135 |
| 7,059,769 B1 | 6/2006 | Potega |
| 7,327,122 B2 | 2/2008 | Kamenoff |
| 7,999,505 B2 * | 8/2011 | Bertness ....................... 320/104 |
| 8,207,740 B2 * | 6/2012 | Lin et al. ....................... 324/427 |
| 8,509,976 B2 * | 8/2013 | Kempton ....................... 701/22 |
| 2008/0053716 A1 * | 3/2008 | Scheucher ..................... 180/2.1 |
| 2011/0156644 A1 * | 6/2011 | Arai ............................... 320/109 |
| 2011/0156652 A1 * | 6/2011 | Kishiyama et al. ........... 320/132 |
| 2011/0202217 A1 * | 8/2011 | Kempton ....................... 701/22 |
| 2011/0215764 A1 * | 9/2011 | Takahashi et al. ............ 320/134 |
| 2012/0286706 A1 * | 11/2012 | Ohkura .......................... 318/139 |
| 2014/0015469 A1 * | 1/2014 | Beaston et al. ............... 320/101 |

* cited by examiner

SYSTEM FOR CONTROLLING BATTERY CONDITIONS

BACKGROUND

1. Field of the Invention

The present invention generally relates to a system for controlling battery conditions.

2. Description of Related Art

Often network access devices, such as those associated with vehicle telematics systems, will need to operate in emergency situations. This functionality may be necessary whether or not the vehicle power systems are functioning or even connected. Accordingly, back up batteries are typically provided for these network access devices.

However, the effectiveness of a battery to supply sufficient power is diminished when the temperature of the battery is close to or below 0° C. The lower temperature increases the output impedance of the battery causing increased voltage drop between the cell and the load when the load current increases. Depending on the battery chemistry, this effect may be more pronounced.

The effect of this increased impedance is to reduce the available talk time as the ambient temperature is decreased. For ECALL applications, customers are expecting the ability to maintain a call for up to 11 minutes at −20° C. or 5 minutes at −30° C.

SUMMARY

One solution to this problem would be to increase the size and/or capacity of the battery. The main drawback of this is primarily a high cost and larger package size. For an automotive ECALL application, having a smaller package size and lower cost is a distinct advantage.

In order to provide the required talk time at temperatures that are expected in an automotive or outdoor environment, using the smallest and lowest cost battery technology, it becomes desirable to maintain the temperature of the battery pack above a minimum operating threshold. This threshold will typically be between −20° C. and +10° C. at ambient temperatures as low as −40° C. Elevating the temperature of the battery pack by 20° C. to 30° C. above ambient can be accomplished by placing a heating element in close proximity to the case of the cell.

Battery packs can incorporate some type of temperature sensor which is mounted in close proximity of the battery cell and may even be thermally coupled to the battery cell. This temperature sensor can be used to control when charge and discharge cycles of the back up battery may occur. This same sensor may be used to control the heating element in order to maintain the cell temperature near the desired operating point which would typically be greater than 0° C.

In many applications, particularly in a vehicle, it is desired to determine the effective end of life of the battery. This is often accomplished by measuring the output impedance of the cell. One technique used to measure the output impedance is to measure the change in voltage with the battery unloaded and also when a load is connected. By measuring the open circuit voltage as well as the voltage under load and knowing the load impedance, the output impedance of the battery can be calculated.

In the system described, the load that is used to perform this diagnostic function may also be used as the heating element. The heating element consists of an etched trace on a flexible substrate so that the shape of the heating element can be contoured to match the shape of the cells being heated. This technique should provide uniform heating throughout the full volume of the cell. This could be similar to heating pads used to heat lead-acid batteries in vehicles.

For an ECALL application, it is possible that the event that triggers the call could occur some short period of time after the vehicle has been running. In this case, the heating element can be powered from the vehicle's alternator as the secondary power source so that the maximum capacity of the back up battery can be obtained. As part of the power path management, a switch is used to connect the heating element to either the secondary power source or to the battery pack.

There are also use cases where the vehicle will be stored in a cold environment for some duration, perhaps overnight. If the heater is activated only when the ignition switch is in the RUN position, there will be a delay before the back up battery is warmed sufficiently to complete a call. In order to have the back up battery warmed before the vehicle is started, a timer could be used to turn on the heater at some preset time. This timer could be set to trigger at a fixed time every day similar to an alarm clock based on a stored operation profile. A more sophisticated technique would include making the heating time adaptive based on the users habits. In this case, an algorithm would be used to learn the most likely time the vehicle is started each day and to activate the heater at a time before this predicted time so that the heater has sufficient time to heat the battery before the expected start of the vehicle. Of course, the user would have the option to disable this feature if they were concerned with discharging the vehicle battery.

The application of this idea could be used in any Telematics product that requires the use of a back up battery used to place a call in the event that the vehicle battery gets disconnected. There is also a potential use in applications where modems are used as a data port to provide diagnostics and operating conditions of remotely located motor-generator sets. Another possible application could be in systems that are deployed outdoors that are normally powered from primary power lines but also require a battery backup system.

In the system described, the power for heating the backup battery is coming from a secondary power source. In particular, this could be an engine, either in a vehicle or stationary, with the current for the heating element supplied from an alternator or from a primary power line with current supplied through a transformer and charger.

Further objects, features and advantages of this invention will become readily apparent to persons skilled in the art after a review of the following description, with reference to the drawings and claims that are appended to and form a part of this specification.

DETAILED DESCRIPTION

Figure 1:
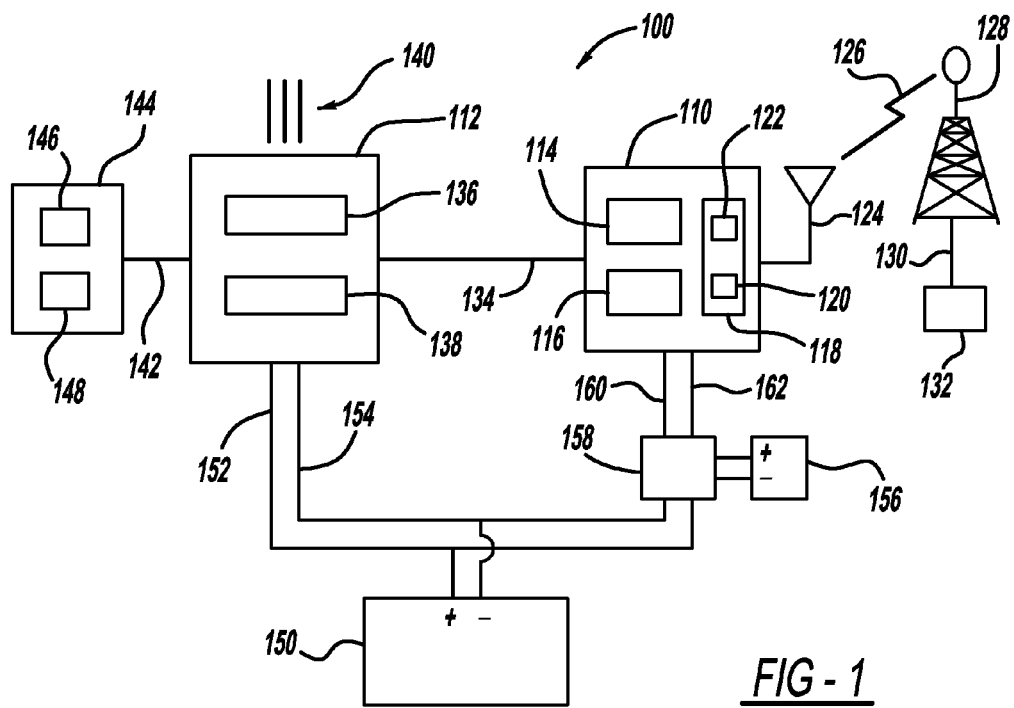
FIG. 1 is a schematic view of a system including a telematics controller and a network access device.

Now referring to FIG. 1, a system 100 is provided. The system includes a network access device 110 and a telematics controller 112. The network access device 110 may include a processor 114 and storage 116. The processor 114 may be a programmable microprocessor or alternatively may be an application specific integrated circuit (ASIC), or other known processor. The storage 116 may be a memory, for example, random access memory, static memory, or other data storage device. The network access device 110 may also include a transceiver 118 which includes a transmitter 122 and a receiver 120. Alternatively, the network access device 110 may include an independent transmitter and receiver. The transceiver 118 may be in communication with an antenna 124. The transceiver 118 may communicate with a radio tower 128 as denoted by line 126. The communication 126 between the network access device 110 and the radio tower 128 may comprise one of a plurality of communication modes.

The transceiver 118 in the network access device 110 may be used for transmitting uplink communications and receiving downlink communication to and from the network 130 and service center 132 over the wireless communication link 126. The wireless communication link 126 may use a wireless protocol such as a standard cellular network protocol, for example, transmission control protocol/internet protocol (TCP/IP), Code Division Multiple Access (CDMA), Global System for Mobile Communications (GSM).

The radio tower 128 may be in communication with a service provider 132 including for example, a network server through a network 130. Network 130 may be an analog network such as a plain old telephone service (POTS) or a digital network for example, Ethernet over transmission control protocol/internet protocol (TCP/IP). In other examples, the network 130 could be one of several standard cellular communication networks, a satellite-based network, a public switched telecommunication network (PSTN), the Internet, an integrated services digital network (ISDN), and/or other communication networks. The service provider may include a service center to provide telematics applications and services to the vehicle. For instance, the service center may contain operators, content servers and content databases. The content servers for telematics applications and services may include traffic servers, map servers, user profile servers, location information servers, and the like. The content databases for telematics applications and services may include location information, user profiles, traffic content, map content, point-of-interest content, usage history, or other similar data.

The network access device 110 may be in communication with the telematics controller 112 through a communication interface 134. In some implementations the network access device 110 may be in the same package as the telematics controller 112. However, other implementations the network access device 110 may be provided in a separate package from the package of the telematics controller 112 and, therefore, may be located in a different area of the vehicle. Various information may be communicated between the telematics controller 112 and the network access device 110.

The telematics controller 112 may include a processor 136 and storage 138. The processor 136 may be a microprocessor, an application specific integrated circuit, a programmable gate array, or other processor. Further, the storage 138 may be a memory device for example, random access memory, read only memory, static memory, or may even be a hard drive or optical drive, or other means of data storage. The telematics control 112 may be in communication with a plurality of other vehicle sensors and devices through a wire harness or over the vehicle bus as denoted by lines 140. In addition, the telematics controller 112 may be in communication with a user interface 144 as denoted by line 142. The user interface 144 may include a display 146 and controls 148 for providing user input such as vehicle parameters into the telematics controller 112. Also, the user interface 144 may include elements such as a keyboard or keypad, one or more control buttons, indicator lights, one or more speakers, a microphone, and any other user interface type elements for telematics applications and services. Optionally, the telematics controller 112 may also be connected to a positioning unit. The positioning unit could be a system that determines the geographic location of the vehicle such as a global positioning system (GPS) or similar systems.

Further, the telematics controller 112 may be in communication with other vehicle systems, such as the engine control system, the vehicle lock controls, the vehicle safety systems (e.g. seatbelt retractors, airbags, etc.), vehicle entertainment system, or a suspension control system to implement the described functions of the telematics controller 112 or network access device 110 based on parameters of such systems.

The telematics controller 112 may be powered by the vehicle battery 150 as denoted by lines 152 and 154. Alternatively, a voltage converter may be provided to convert from the vehicle battery voltage to a different voltage that may be appropriate for running the telematics controller 112. The voltage converter may be included in the package for the telematics controller 112 or alternatively may be in a separate package between the vehicle battery 150 and the telematics controller 112. The vehicle battery 150 may also provide power to the network access device 110.

A circuit 158 may be included between the vehicle battery 150 and the network access device 110. The circuit 158 may include a voltage converter to change the voltage provided to the network access device 110 in lines 160 and 162. In addition, the circuit 158 may be connected to a network access device battery 156. The network access device battery 156 may be charged while the vehicle is running and may for example, be switched to provide power to the network access device 110 when power from the vehicle power system (e.g., the battery or alternator) is not available. Further, the circuit 158 may control the monitoring and periodic powering of the network access device if the vehicle is turned off for a long period of time. Further, the circuit 158 may control the charging of the network access device battery 156 at appropriate times according to the environmental variables or the expected use cycle of the vehicle.

Figure 2:
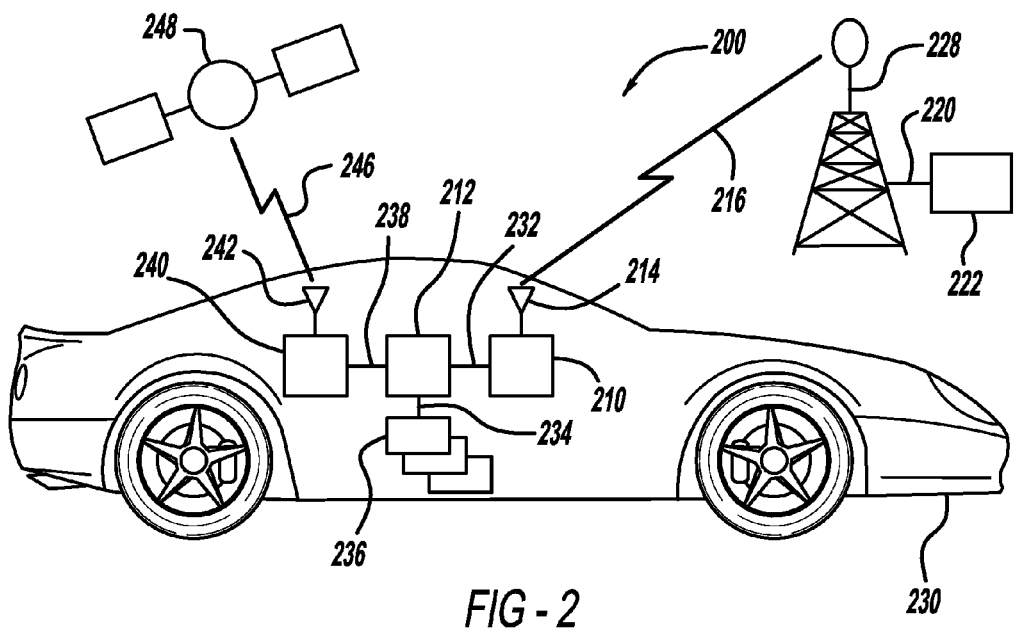
FIG. 2 is a schematic view of a system with a telematics controller and network access device implemented within a motor vehicle.

Now referring to FIG. 2, one possible implementation of the system 200 is provided within a vehicle 230. The network access device 210 may be provided in the same or a separate package from the telematics controller 212. The network access device 210 may be connected to an antenna 214. The antenna 214 may be representative of a plurality of antennas or a matrix of antennas depending upon the particular communication mode selected. Communication of the network access device 210 is facilitated with a remote station 228, as denoted by line 216. As described previously, the remote station 218 may be in communication with a service provider 222 including a network server through a network 220. The telematics controller 212 may be in communication with a global positioning device 240 over the vehicle bus or a custom connection as denoted by line 238. The global positioning device 240, such as a satellite global positioning system (GPS), may be in communication with an antenna 242. The antenna 242 may be one of a plurality of antennas or a matrix of antennas. Further, the antenna or plurality of antennas represented by reference number 242 may be the same antennas, as denoted by reference number 214. The GPS unit may be in communication with a satellite 248, as denoted by line 246. As such, the GPS unit 240 may retrieve positional data for the vehicle or in other implementations 240 may also represent a general satellite receiver and, therefore, may receive other general broadcast information or communication from the satellite 248. The telematics controller 212 may also be in communication with various other vehicle devices and systems through the vehicle bus, wire harnesses, or other wireless connections, as denoted by line 234. The various other devices 236 may include but are not limited to the engine control system, the vehicle locks, the vehicle safety systems (e.g. seatbelt retractors, airbags, etc.), vehicle entertainment system, or a suspension control system.

Figure 3:
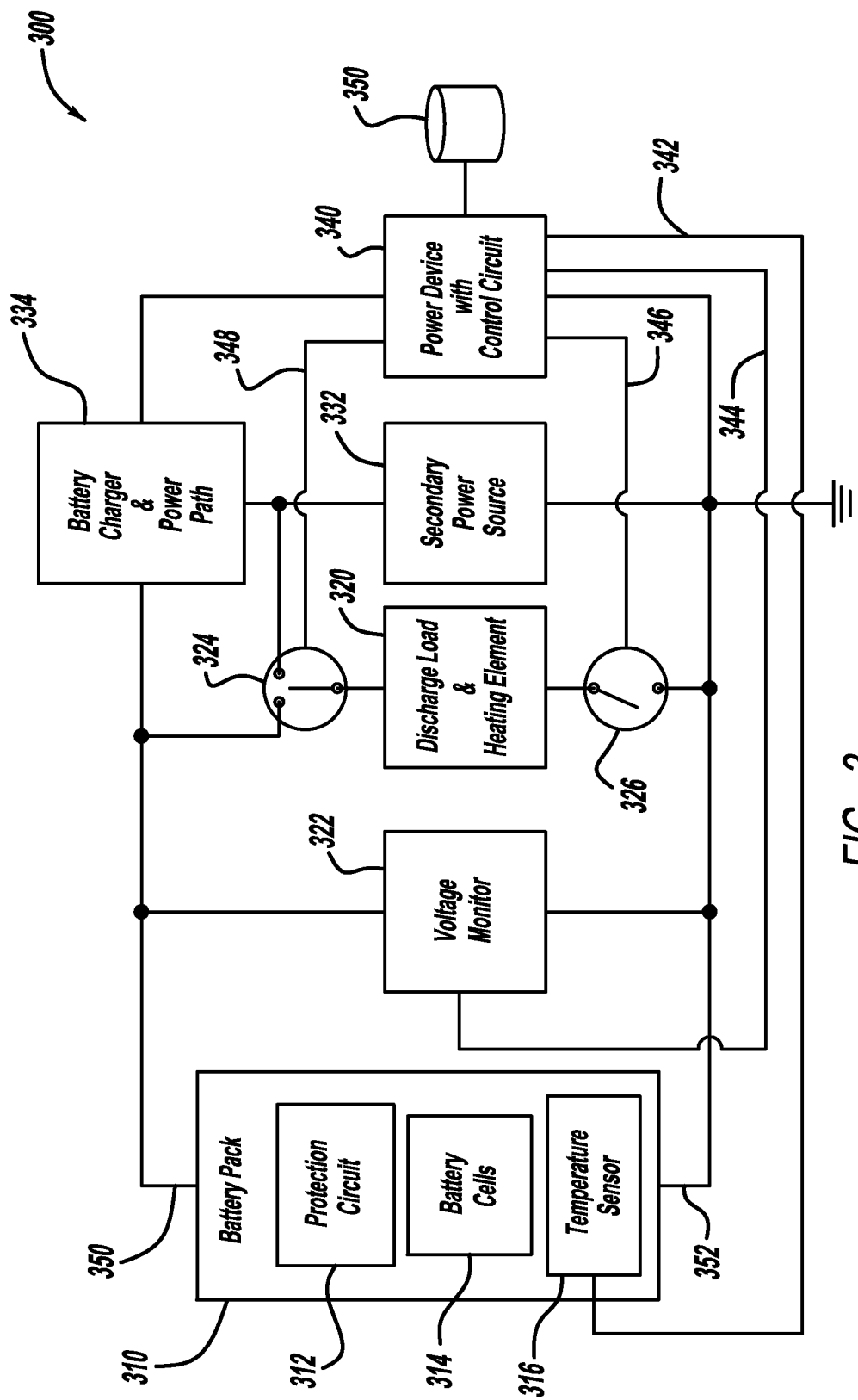
FIG. 3 is a schematic view of a circuit for controlling battery conditions.

Now referring to FIG. 3, a system 300 for controlling conditions of a battery pack 310 is provided. The battery pack 310 may include battery cells 314 for storing electrical energy, as well as, a protection circuit 312 and a temperature sensor 316. The protection circuit 312 may protect the battery cells 314 from an excessive surge or depletion in voltage or current that may damage the battery cells 314. In addition, the temperature sensor 316 may be located proximate to battery cells 314 to provide a temperature of the battery cells 314. The battery pack 310 may serve as a backup battery such as a NAD backup battery 156 for FIG. 1.

A discharge load 320 may be connected in electrical series connection between a positive terminal 350 of the battery pack and a negative terminal 352 of the battery pack. The discharge load 320 may be a resistive load such as a resistor, but generally will include an impedance along the voltage drop to occur across the discharge load 320. In addition, a voltage sensor 322 may be in parallel electrical connection with discharge load 320. As such, the voltage sensor 322 may measure the voltage between the positive terminal 350 of the battery pack 310 and the negative terminal 352 of the battery pack 310, and therefore, correspondingly the voltage drop across the discharge load 320.

The discharge load 320 may also be a heating element. For example, the discharge load 320 may be a resistive heater such that the energy dissipated across the discharge load 320 is converted into thermal energy for heat. As such, the discharge load 320 may be in thermal communication with the battery cells 314 to warm the battery cells and provide an improved energy storage performance. Further, the discharge load 320 may be connected to the battery cells 314 directly or through a thermal conductive element.

The resistive load acting as a heating element may be distributed across the area of the cell to provide more uniform heating. Using a resistive trace on a flexible substrate, the heating element is designed to surround the cell or battery pack like an electric blanket. The heating element could also be on a portion of the rigid PCB substrate with the battery mounted in close proximity. In other implementations, the heating element consists of an etched trace on a flexible substrate so that the shape of the heating element can be contoured to match the shape of the cells being heated. This technique should provide uniform heating throughout the full volume of the cell.

Switches 324 and 326 may be provided between the battery pack 310 and the discharge load 320. Accordingly, each of the switches 324 and 326 may selectively connect the discharge load 320 to the battery pack 310. Disconnecting the battery pack 310 from the discharge load 320 prevents power draw from the battery cells 314. The switch 324 may be a three connection switch allowing the discharge load 320 to be connected to either the battery pack 310 or the secondary power source 332. Meanwhile, the switch 326 may be a two connection switch, for example, to selectively connect the discharge load 320 to the negative terminal of the battery and an electrical reference such as an electrical ground.

The secondary power source 332 may be the vehicle battery or the vehicle alternator. The secondary power source 332 may be connected to a battery charger 334. The battery charger 334 may include a power path switch that may connect the battery 310 to either the secondary power source for charging, the power device 330 such as the network access device 110 from FIG. 1, or both. In a normal operation mode, the battery pack 310 would be isolated from both the secondary power source 332 and the power device 330 where the secondary power source 332 will provide electrical power to the power device 330, for example, through the battery charger and power path switch of the battery charger 334.

In addition, a processor 340 may be provided to control the operation of the system 300 and, for example, determine switching between various operational modes such as a normal operation mode, a charging operation mode, and a heating operation mode. In the normal operating mode, the secondary power source 332 will power the device 330 while the battery pack 310 will remain isolated for storing emergency power. Accordingly, the processor 340 will control switch 324 as denoted by line 348 such that the switch 324 will not connect any of the three points thereby isolating each of the battery pack 310, the discharge load 320, and the secondary power source 332 from each other. Further, the processor 340 will control switch 326 such that the discharge load 320 will be disconnected from the electrical reference. The processor 340 will also periodically connect the discharge load 320 between the positive terminal 350 and the negative terminal 352 of the battery pack 310 to determine a charge status of the battery cells 314. Various test methodologies may be used to determine the battery charging status, for example, the voltage drop across the discharge load 320 may be indicative of the battery storage capacity and used to determine the battery status.

As such, the processor 340 is in communication with the voltage sensor 322, as denoted by line 344, to measure the voltage drop across the discharge load 320 while in connection with the battery pack 310. If the voltage drop is below a threshold voltage drop, for example, indicating a low charge battery status, the battery charger 334 may connect the secondary power source 332 with the battery pack 310 for charging purposes. The battery charger 334 may allow charging of the battery pack 310 for a predetermined time period or until the voltage sensor 322 indicates that the battery cells 314 are sufficiently charged.

However, as discussed above, the battery cells 314 provide the poor performance and charging characteristics at very cold temperatures. As such, the temperature sensor 316 is in communication with the processor 340, as denoted by line 342, to provide a temperature indication of the battery cells 314. With the temperatures below a threshold temperature, the processor 340 may control the switches 324 and 326 to allow power to be supplied to the discharge load 320. For example, the power may be provided from the secondary power source 332 and, thereby, provide a dual action as a heating element to warm the battery cells 314, as well as, facilitating an impedance measurement of the battery. The processor 340 may control the heating of the battery cells 314 using the discharge load 320 until the temperature sensor 316 indicates that the temperature of the battery cells 314 has exceeded a threshold temperature. However, it is understood that other parameters may be used to control the heating process for example, a predetermined time period or the voltage measurement from the voltage sensor 322.

In addition, the processor 340 may be in communication with a storage device 350 to retrieve information indicating the time of usage of the vehicle including such information as typical operation times, length of operation associated with the various operation times, ambient temperature conditions associated with the operation times, and other similar associations. Accordingly, the processor 340 may determine based on the described information if operation, for example a drive or other usage, is expected in the near future. Further, the processor 340 may determine a heating schedule based on the above noted parameters. As such, the processor 340 may check the battery status using the voltage sensor 322 or may preemptively determine to charge the battery cells 314 in anticipation of expected operation. Accordingly, the processor 340 may instruct the battery charger 334 to charge the battery back 310 based on the anticipated operation.

Based on a temperature sensor measurement, the information from the database 350, or both, the processor 340 may use the discharge load 320 to warm the battery cells 314 above a threshold temperature prior to charging the battery pack 310. Further, the processor 340 may utilize discharge load 320 to warm the battery cells 314 in anticipation of and during the operation to improve the storage performance of the battery cells 314 independent of the charging of the battery pack 310. Again, the heating of the battery cells 314 for battery performance purposes may also be based on one of the temperature sensors 316 and/or the information from the data store 350.

Figure 4:
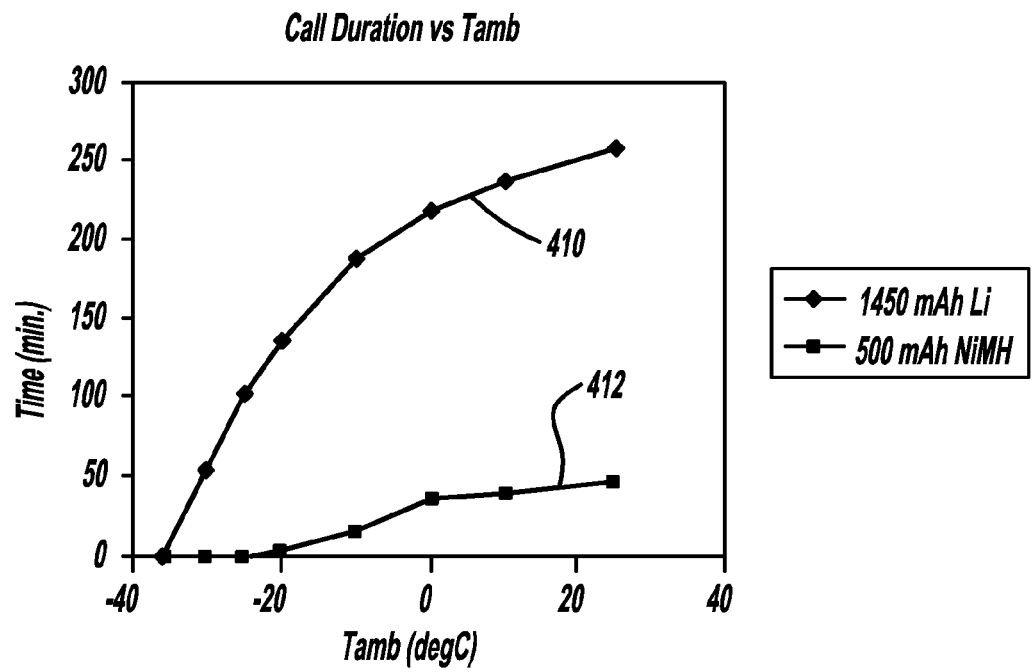
FIG. 4 is a graph illustrating the call duration provided by a battery with respect to the ambient temperature.

Now referring to FIG. 4, a graph of the call duration provided by a battery is provided graphically with respect the ambient temperature. As discussed previously, the battery performance and, therefore, the call duration does degrade at low temperature conditions. This principle is illustrated in the curves 410 and 412. Line 410 represents the call duration for a lithium ion battery, whereas, the line 412 represents the call duration for a metal hydride battery. Significant battery degradation for both battery types can be seen around the 0° C. temperature range.

Figure 5:
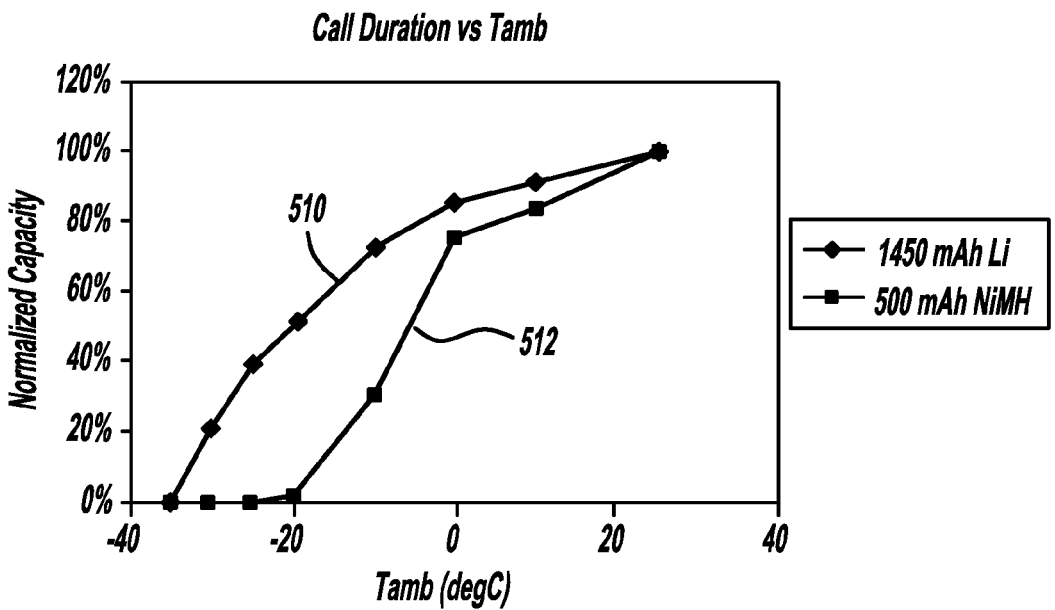
FIG. 5 is a graph illustrating the battery capacity with respect the ambient temperature.

Now referring to FIG. 5, a graph of the available capacity of the battery is plotted with regard to ambient temperature. Line 510 illustrates the available capacity of a lithium ion battery whereas, line 512 illustrates the capacity of a nickel metal hydride battery. The lithium ion battery provides better normalized capacity performance especially in the −20 to −30 temperature ranges, both batteries provide a 0% normalized capacity around the negative 35° temperature range. Accordingly, there is a significant benefit from using the discharge load 320 as a heating element to increase the temperature of the battery pack prior to charging or anticipating use of the battery.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

We claim:

1. A system for controlling battery conditions, the system comprising:
   a wireless network access device;
   a first battery, configured to provide power to the wireless network access device;
   a backup battery configured to provide power to the wireless network access device when the first battery is not able to provide power to the wireless network access device;
   and
   a battery control circuit comprising a resistive load in thermal communication with the backup battery, and comprising a sensor configured to determine a temperature of the backup battery, the battery control circuit being additionally configured to provide electric power to the resistive load and thereby provide heat to the backup battery responsive to a determination that the temperature of the backup battery temperature is below a first threshold temperature.

2. The system according to claim 1, wherein the battery control circuit is additionally configured to provide electric power to the resistive load, from the first battery.

3. The system according to claim 1, wherein the resistive load comprises a printed circuit board, at least a portion of which is thermally coupled to the backup battery.

4. The system according to claim 1, the resistive load comprises a trace on a flexible substrate.

5. The system according to claim 1, further comprising an alternator and wherein the battery control circuit is configured to cause the alternator to provide electric power to the resistive load.

6. The system according to claim 1, wherein the resistive load is coupled to the network access device by a thermal conductor.

7. The system according to claim 1, wherein battery control circuit is configured to learn a time when to provide heat the backup battery based on a measured temperature of the backup battery.

* * * * *